United States Patent
Yang et al.

(10) Patent No.: US 8,149,804 B2
(45) Date of Patent: Apr. 3, 2012

(54) MULTI-TRANSCEIVER WIRELESS COMMUNICATION DEVICE AND METHODS FOR OPERATING DURING DEVICE DISCOVERY AND CONNECTION ESTABLISHMENT

(75) Inventors: Xue Yang, Portland, OR (US); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 12/062,707

(22) Filed: Apr. 4, 2008

(65) Prior Publication Data

US 2009/0252128 A1 Oct. 8, 2009

(51) Int. Cl.
*H04W 4/00* (2009.01)
(52) U.S. Cl. ........................................ 370/338
(58) Field of Classification Search .......... 370/328, 370/329, 3, 38, 336, 43, 7, 345–348, 442–444, 370/449, 461, 462
See application file for complete search history.

(56) References Cited

U.S. PATENT DOCUMENTS

| 7,002,943 B2* | 2/2006 | Bhagwat et al. | 370/338 |
| 7,545,787 B2* | 6/2009 | Bitran et al. | 370/338 |
| 7,688,784 B2* | 3/2010 | Bitran et al. | 370/329 |
| 2007/0232358 A1 | 10/2007 | Sherman | |

FOREIGN PATENT DOCUMENTS

EP 1119137 A1 7/2001

OTHER PUBLICATIONS

"European Application Serial No. 09157297.4, Office Action mailed Apr. 27, 2010", 8 pgs.
"Chinese Application Serial No. 200910133158.5, Office Action mailed Aug. 23, 2010" 5 pgs.
"Chinese Application Serial No. 200910133158.5, Office Action mailed Apr. 6, 2011", 9 pgs.

* cited by examiner

*Primary Examiner* — Chi Pham
*Assistant Examiner* — Alexander Boakye
(74) *Attorney, Agent, or Firm* — Schwegman, Lundberg & Woessner, P.A.; Gregory J. Gorrie

(57) ABSTRACT

Embodiments of a multi-transceiver wireless communication device and methods for operating during device discovery and connection establishment are generally described herein. In some embodiments, the multi-transceiver wireless communication device includes a broadband wireless access network (BWAN) transceiver and a short-range frequency-hopping (SRFH) transceiver. The SRFH transceiver transmits a non-continuous sequence of either page or inquiry trains to either discover or establish an initial connection with a SRFH device when an active BWAN connection exists with a base station. The non-continuous sequence of trains may include a regularly repeating vacant transmission interval selected to coincide with listen intervals of frames when the BWAN transceiver is in sleep mode.

23 Claims, 5 Drawing Sheets

MULTI-TRANSCEIVER WIRELESS COMMUNICATION DEVICE AND METHODS FOR OPERATING DURING DEVICE DISCOVERY AND CONNECTION ESTABLISHMENT

TECHNICAL FIELD

Some embodiments pertain to wireless communication devices. Some embodiments pertain to multi-transceiver platforms that include co-located transceivers, such as a Worldwide Interoperability for Microwave Access (WiMax) transceiver and a Bluetooth (BT) transceiver. Some embodiments pertain to Bluetooth device discovery and initial connection establishment during an established WiMax connection.

BACKGROUND

Many wireless communication devices today include more than one transceiver for communicating in accordance with different communication standards and techniques. One issue with these multi-transceiver devices is that the communications of one transceiver may interfere with the communications of another transceiver. For example, when a wireless communication device includes a WiMax transceiver and a BT transceiver, transmissions by one transceiver may interfere with the receptions of the other transceiver.

Thus, there are general needs for systems and methods that help reduce conflicts between the co-located transceivers of a multi-transceiver wireless communication device.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
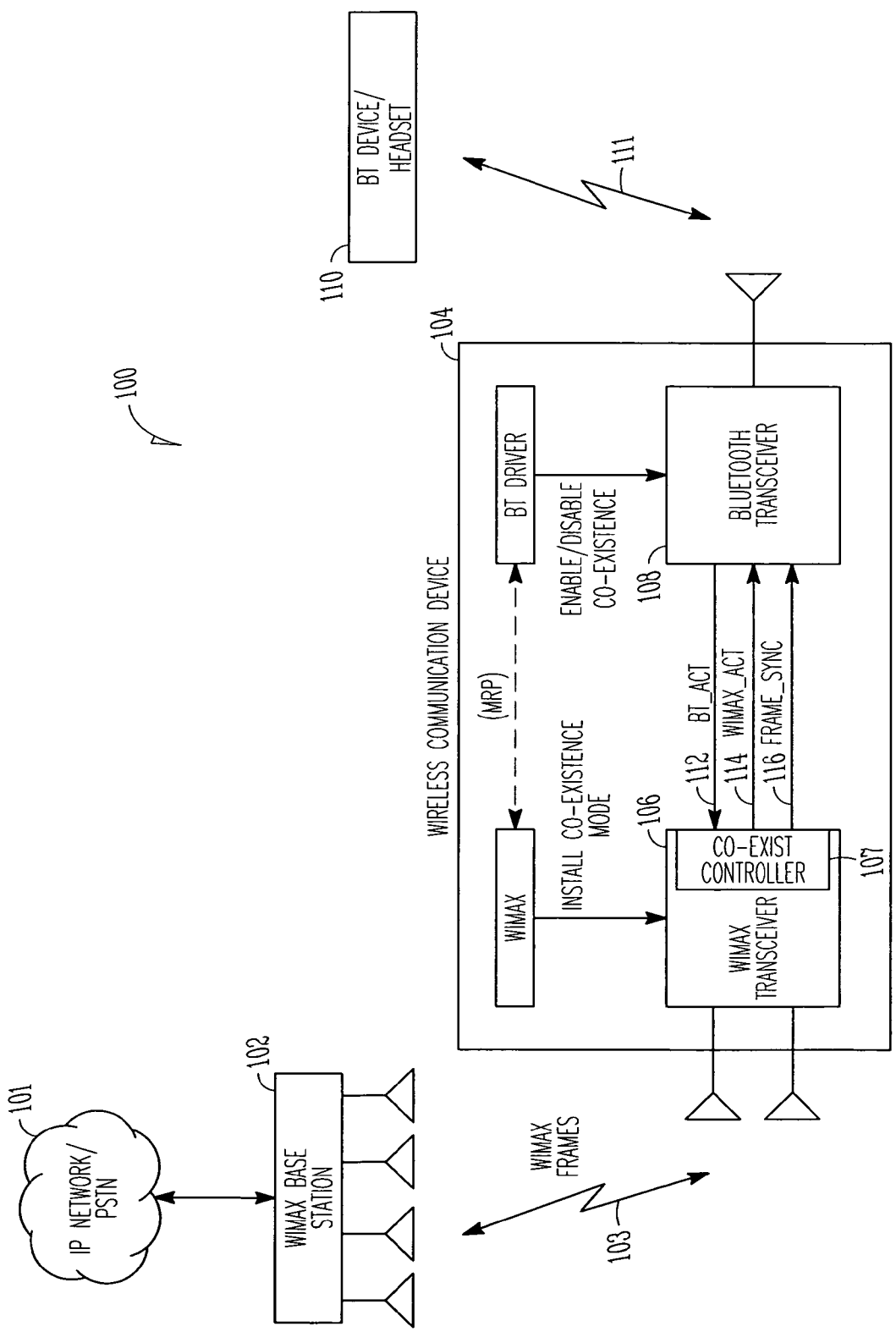
FIG. 1 illustrates an environment in which wireless communications may take place with some embodiments.

FIG. 1 illustrates an environment in which wireless communications may take place with some embodiments. Environment 100 includes WiMax base station 102, wireless communion device 104 and BT device 110. Wireless communication device 104 is a multi-transceiver communication device and includes WiMax transceiver 106 for communicating with WiMax base station 102 using WiMax frames 103. Wireless communication device 104 also includes BT transceiver 108 for communicating with BT device 110. In these embodiments, wireless communication device 104 is a multi-radio platform (MRP). BT transceiver 108 may, among other things, discover BT device 110 and establish communications with BT device 110 as described in more detail below. WiMax base station 102 may be coupled with one or more networks 101, such as the Internet or the PSTN to provide communications between networks 101 and wireless communication device 104.

In accordance with some embodiments, to either discover or establish an initial connection with BT device 110, BT transceiver 108 may transmit a non-continuous sequence of trains for receipt by BT device 110 when a WiMax connection is currently established with WiMax base station 102. The non-continuous sequence of trains may, for example, include a regularly repeating vacant transmission interval selected to coincide with WiMax listen intervals of WiMax frames 103 during sleep mode. These embodiments, as well as other embodiments for discovering a BT device or establishing an initial connection with a BT device over link 111 while a WiMax connection is active, are discussed in more detail below.

In some embodiments, link 111 established between BT transceiver 106 and BT device 110 may be a synchronous connection oriented (SCO) link or an extended SCO (eSCO) link. In some other embodiments, link 111 established between BT transceiver 106 and BT device 110 may be an Asynchronous Connection-Less (ACL) link.

In some embodiments, BT transceiver 108 may provide BT active (BT_ACT) signal 112 to WiMax transceiver 106 to indicate, among other things, when BT transceiver is in a critical stage, such as discovering or establishing an initial connection with BT device 110. WiMax transceiver 106 may provide WiMax active (WIMAX_ACT) signal 114 to BT transceiver 108 to indicate when WiMax transceiver 106 is receiving. WiMax transceiver 106 may also provide frame-sync (FRAME_SYNC) signal 116 to BT transceiver 108 to convey WiMax frame timing information as well as sleep pattern information. In some embodiments, WiMax transceiver 106 may include coexist controller 107 to enable coexistence with BT transceiver 108 and to provide WiMax active signal 114 and frame-sync signal 116. In some embodiments, BT transceiver 108 may refrain from transmitting when WiMax active signal 114 indicates that WiMax transceiver 106 is receiving.

The term Bluetooth, as used herein may refer to a short-range digital communication protocol including a short-haul wireless protocol frequency-hopping spread-spectrum (FHSS) communication technique operating in the 2.4 GHz spectrum. The term WiMax may refer to a broadband wireless access (BWA) communication technique that may implement an orthogonal frequency division multiple access (OFDMA) technique that may potentially interfere with the spectrum utilized by BT communications, including interference due to out-of-band (OOB) emissions. The use of the terms Bluetooth and WiMax are not intended to restrict the embodiments to any of the requirements of the standards and specifications relevant to Bluetooth or WiMax.

In some embodiments, wireless communication device 104 may be a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, BT transceiver 108 may communicate in accordance with a short-range wireless standard such as the Bluetooth short-range digital communication protocol. In some embodiments, BT transceiver 108 may transmit signals in accordance with an ultra-wideband (UWB) communication technique where a carrier frequency is not used.

In some embodiments, WiMax transceiver 106 and WiMax base station 102 may communicate orthogonal frequency division multiplexed (OFDM) communication signals over a multicarrier communication channel in accordance with multiple access technique, such as OFDMA. The OFDM signals may comprise a plurality of orthogonal subcarriers. In some of these multicarrier embodiments, WiMax transceiver 106 and WiMax base station 102 may communicate in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some embodiments, WiMax transceiver 106 and WiMax base station 102 may use one or more antennas for communications. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, two or more antennas may be effectively separated to take advantage of spatial diversity and the different channel characteristics that may result.

Although WiMax base station 102 and WiMax transceiver 106 are referred to as WiMax devices, the scope of the invention is not limited in this respect, as base station 102 and transceiver 106 may be configured to operate in other types of broadband wireless access networks (BWAN) and standards. Although BT transceiver 108 and BT device 110 are referred to as BT devices, the scope of the invention is not limited in this respect, as transceiver 108 and device 110 may be configured to operate in accordance with other communication techniques including other short-range frequency-hopping (SRFH) techniques and standards.

Figure 2:
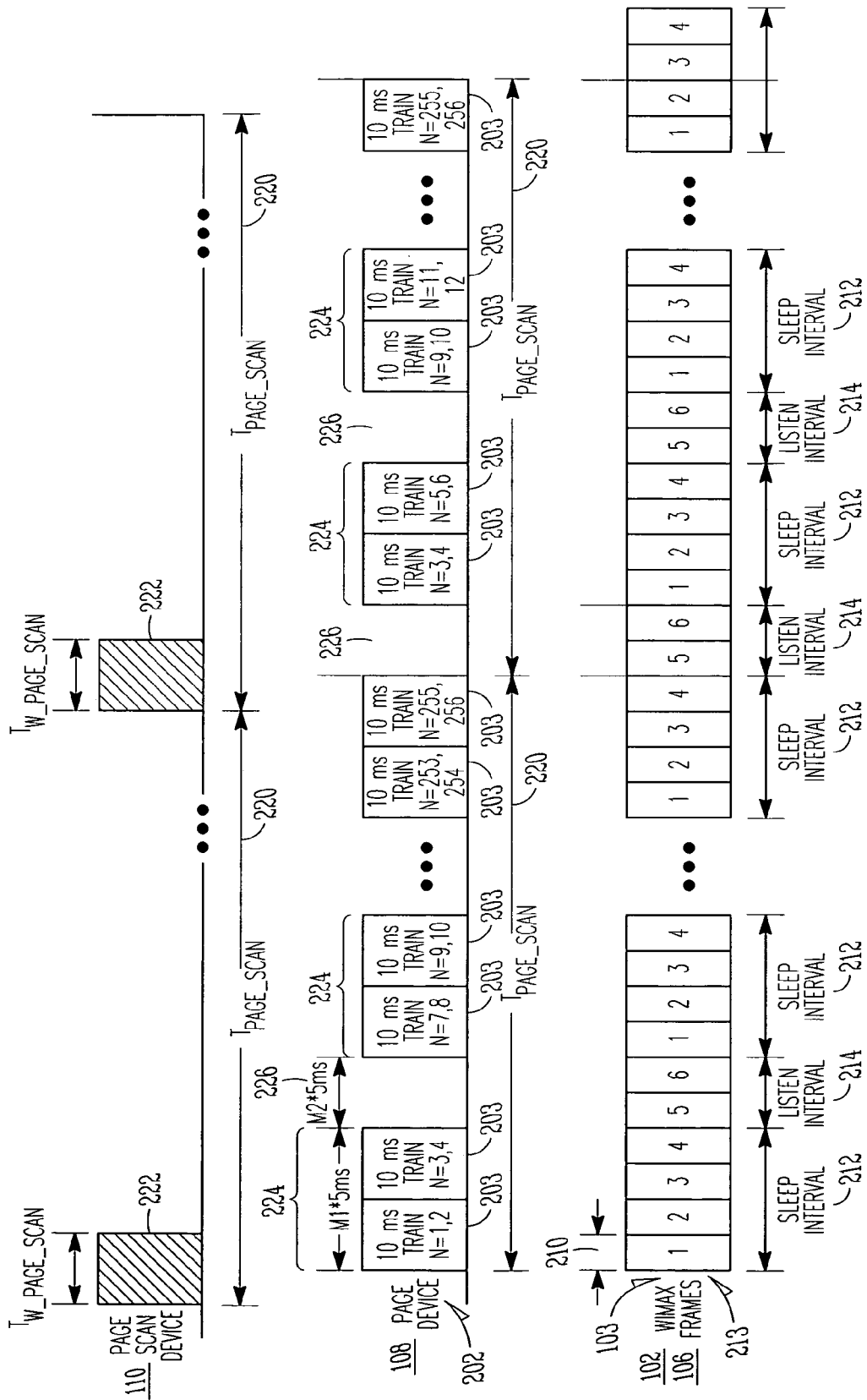
FIG. 2 illustrates some of the various signaling within the environment of FIG. 1 in accordance with some embodiments.

FIG. 2 illustrates some of the various signaling within the environment of FIG. 1 in accordance with some embodiments. To either discover or establish an initial connection with BT device 110 (FIG. 1), BT transceiver 108 (FIG. 1) may transmit non-continuous sequence 202 of trains 203 for receipt by BT device 110 (FIG. 1) when a WiMax connection is currently established with WiMax base station 102 (FIG. 1). As illustrated in FIG. 2, non-continuous sequence 202 of trains 203 may include regularly repeating vacant transmission interval 226 selected to coincide with WiMax listen intervals 214 of WiMax frames 103 during sleep mode.

Trains 203 may include page trains, which may be used to page a BT device as part of a paging procedure, and inquiry trains, which may be used to inquire about unknown BT devices as part of an inquire procedure. The critical stages of BT transceiver 108, as used herein, may include paging, inquiring, page scanning, and inquiry scanning. During paging and page scanning, page trains may be used, and during inquiring and inquiry scanning, inquiry trains may be used.

In some embodiments, vacant transmission interval 226 comprises a multiple number (M2) of WiMax frame durations 210 selected to regularly repeat within non-continuous sequence 202 of trains 203 during page scan interval 220. BT device 110 (FIG. 1) may listen for trains 203 during each page scan window 222, which may occur once every page scan interval 220.

As further illustrated in FIG. 2, non-continuous sequence 202 of trains 203 may also include regularly repeating active transmission interval 224 comprising one or more trains 203. Active transmission interval 224 may include an even multiple (M1) of WiMax frame durations 210 selected to regularly repeat within non-continuous sequence 202 of trains 203 during page scan interval 220. As illustrated in FIG. 2, non-continuous sequence 202 of trains 203 may comprise a plurality of active transmission intervals 224 and vacant transmission intervals 226 having their durations selected as described herein. One or more trains 203 may be transmitted during each active transmission interval 224, and one or more trains 203 may be refrained from being transmitted during vacant transmission intervals 226. In some embodiments, M1 and M2 may be selected to help guarantee that page scan window 222 coincides with one complete train 203 within two page scan intervals 220 for paging, or to help guarantee that an inquiry scan window coincides with one complete train 203 within two inquiry scan intervals for inquiring. These embodiments are discussed in more detail below.

For example, if WiMax frame duration 210 is 5 milliseconds (ms), the non-continuous sequence 202 of trains 203 may comprise a plurality of transmission intervals each having a duration of 10 ms, vacant transmission interval 226 may have a duration of M2*5 ms where M2 is an integer number, and active transmission interval 224 may have a duration of M1*5 ms where M1 is an even number. In the example embodiments illustrated in FIG. 2, active transmission interval 224 is twice as long as vacant transmission interval 226 allowing the transmission of trains 203 to cover every vacant transmission interval 226 within two page scan intervals 220. Other example embodiments are discussed below.

Figure 3:
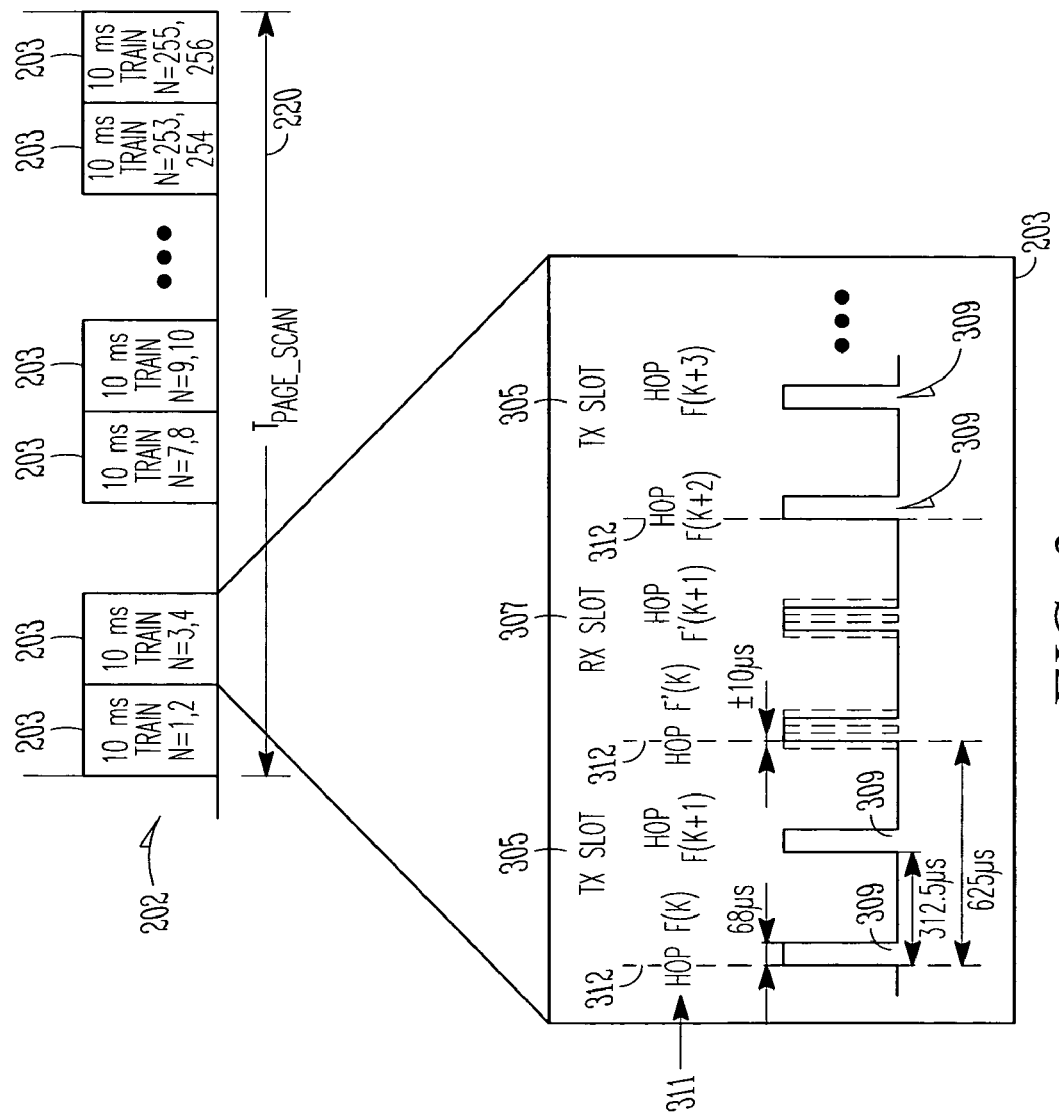
FIG. 3 illustrates a portion of a train in accordance with some embodiments.

FIG. 3 illustrates a portion of a train in accordance with some embodiments. As illustrated in FIG. 3, within each train 203 are BT transmit (TX) slots 305 and BT receive (RX) slots 307. BT transmit slots 305 include a train of identical page messages 309 transmitted at different hop frequencies (f(k)) 311. During BT transmit slots 305, BT transceiver 108 (FIG. 1) is configured to transmit as shown, and during BT receive slots 307, BT transceiver 108 (FIG. 1) is configured to receive. In accordance with some embodiments discussed in more detail below, during receive slots 307 while BT transceiver 108 (FIG. 1) is in a critical stage, WiMax transceiver 106 (FIG. 1) may be instructed to refrain from transmitting. As discussed in more detail below, BT transceiver 108 (FIG. 1) may align slot boundary 312 with the rising edge of frame-sync signal 116 (FIG. 1) to support the concurrent operations of co-located BT and WiMAX transceivers.

Referring to FIG. 2, in some embodiments, BT transceiver 108 (FIG. 1) may be configured to transmit a continuous sequence of trains, such as trains 203, when a WiMax connection with WiMax base station 102 (FIG. 1) is not established. The continuous sequence of trains may be devoid of regularly repeating vacant transmission intervals 226. In these embodiments, BT transceiver 108 (FIG. 1) may refrain from transmitting a continuous sequence of trains during a critical stage when a WiMax connection with WiMax base station 102 (FIG. 1) is established and may transmit non-continuous sequence 202 as described herein.

In some embodiments, the number (M2) of regularly repeating vacant transmission intervals 226 and the number (M1) or regularly repeating active transmission intervals 224 may be determined based on sleep pattern 213 of the WiMax frames 103 with WiMax base station 102 (FIG. 1) when WiMax transceiver 106 (FIG. 1) is in sleep mode. Sleep pattern 213 may include alternating sleep intervals 212 and listen intervals 214, each comprising a number of WiMax frames 103. Regularly repeating vacant transmission intervals 226 may be selected to coincide with WiMAX listen intervals 214. Regularly repeating active transmission intervals 224 may be selected to coincide with WiMAX sleep intervals 212. In these embodiments, the number (M2) of regularly repeating vacant transmission intervals 226 may equal the number of WiMax frames 103 that make up listen interval 212, and the number (M1) or regularly repeating active transmission intervals 224 may equal the number of WiMax frames 103 that make up sleep interval 214.

Figure 4:
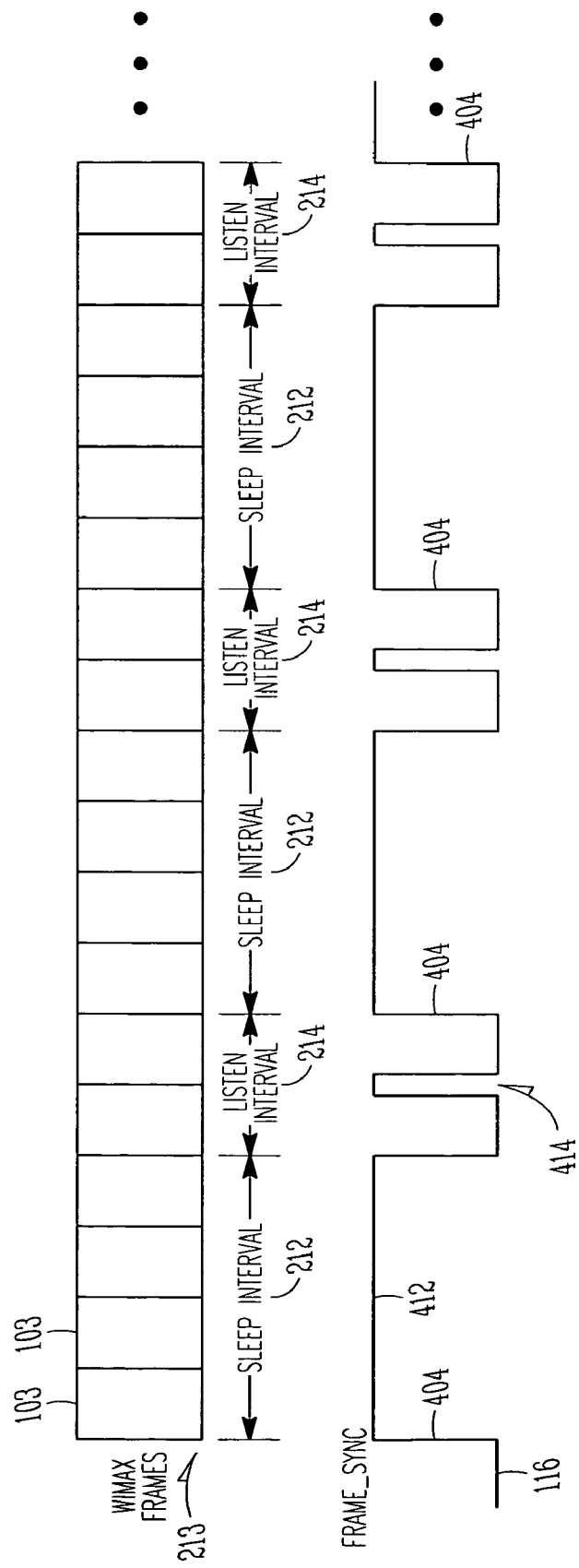
FIG. 4 illustrates a sleep pattern of WiMax frames and a corresponding frame-sync signal in accordance with some embodiments.

FIG. 4 illustrates a sleep pattern of WiMax frames and a corresponding frame-sync signal in accordance with some embodiments. WiMax transceiver 106 (FIG. 1) may provide frame-sync signal 116 to BT transceiver 108. Frame-sync signal 116 may indicate the timing of WiMax frames 103 and sleep pattern 213 of WiMax transceiver 116. In accordance with some embodiments, BT transceiver 108 is configured to align its slot boundary 312 (FIG. 3) with rising edge 404 of frame-sync signal 116 and to detect sleep pattern 213 of WiMax transceiver 106 by monitoring frame-sync signal 116.

In some embodiments, listen intervals 214 of sleep pattern 213 may be indicated by shorter duration signal-level changes 414 of frame-sync signal 116. Sleep intervals 212 of sleep pattern 213 may be indicated by longer duration signal levels 412 of frame-sync signal 116 which may coincide with the sleep intervals 214.

Referring to FIGS. 1 through 4, in some embodiments, BT transceiver 108 may indicate to WiMax transceiver 106 that BT transceiver 108 is entering a critical stage to either discover BT device 110 or establish a connection with an already discovered BT device 110. In response to indication by BT transceiver 108, WiMax transceiver 106 may send a request to WiMax base station 102 to enter sleep mode. The request may include a requested sleep pattern. When WiMax base station 102 grants the requested sleep pattern, BT transceiver 108 may configure non-continuous sequence 202 of trains 203 to include regularly repeating vacant transmission intervals 226 selected to coincide with WiMax listen intervals 214 based on the requested sleep pattern, such as sleep pattern 213.

In some embodiments, wireless communication device 104 may be operable as a WiMax phone and BT device 110 may be operable as a BT headset. In these embodiments, an indication by BT transceiver 108 requesting WiMax transceiver 106 to request to enter sleep mode may be responsive to an incoming call indicated by WiMax base station 102. In some embodiments, the incoming call may be placed on hold during a critical stage of BT transceiver 108 to allow the BT headset to be discovered and/or to be paged to allow a connection to be established with the BT headset, however this is not a requirement. For example, the incoming call does not need to be placed on hold when active WiMax frames are being communicated between WiMax transceiver 106 and WiMax base station 102.

In some embodiments, requested sleep pattern 213 may be determined based on which critical stage has been entered into by BT transceiver 108. When WiMax base station 102 does not grant the requested sleep pattern and the WiMax transceiver 106 does not enter sleep mode, BT transceiver 108 may still transmit the non-continuous sequence of trains 203 to include regularly repeating vacant transmission intervals 226 based on the requested sleep pattern. During the transmission, BT transceiver 108 may signal WiMax transceiver 106 using BT active signal 112 to stop or to refrain from transmitting during receive slots 307 of trains 203. This protects the receptions of BT transceiver 108 during critical mode and allows WiMax transceiver 106 to maintain its connection with WiMax base station 102.

In embodiments when WiMax base station 102 does not grant the requested sleep pattern and a non-requested sleep pattern is granted, BT transceiver 108 may align is operations with the non-requested sleep pattern if M1 and M2 of a non-continuous sequence can be selected so that page scan window 222 will coincide with one complete train 203 within two page scan intervals 220 (e.g., so that a BT device can be successfully discovered or paged). When M1 and M2 of a non-continuous sequence cannot be selected for the granted non-requested sleep pattern so that page scan window 222 will coincide with one complete train 203 within two page scan intervals 220, BT transceiver 108 may transmit the non-continuous sequence of trains 203 based on the requested sleep pattern and may signal WiMax transceiver 106 using BT active signal 112 to stop or to refrain from transmitting during receive slots 307 of trains 203.

In some embodiments, when the request to enter sleep mode is not granted and when WiMax transceiver 106 is in an active communication mode, BT transceiver 108 may signal WiMax transceiver 106 using BT active signal 112 to refrain from transmitting during BT receive slots 307 of trains 203. This may result in a loss of some WiMax transmissions (e.g., the WiMax transmissions that may occur during BT receive slots 307). Although some WiMax transmissions may be lost, WiMax transmissions will not interfere with BT receptions during a critical stage of device discovery or initial connection establishment.

Figure 5:
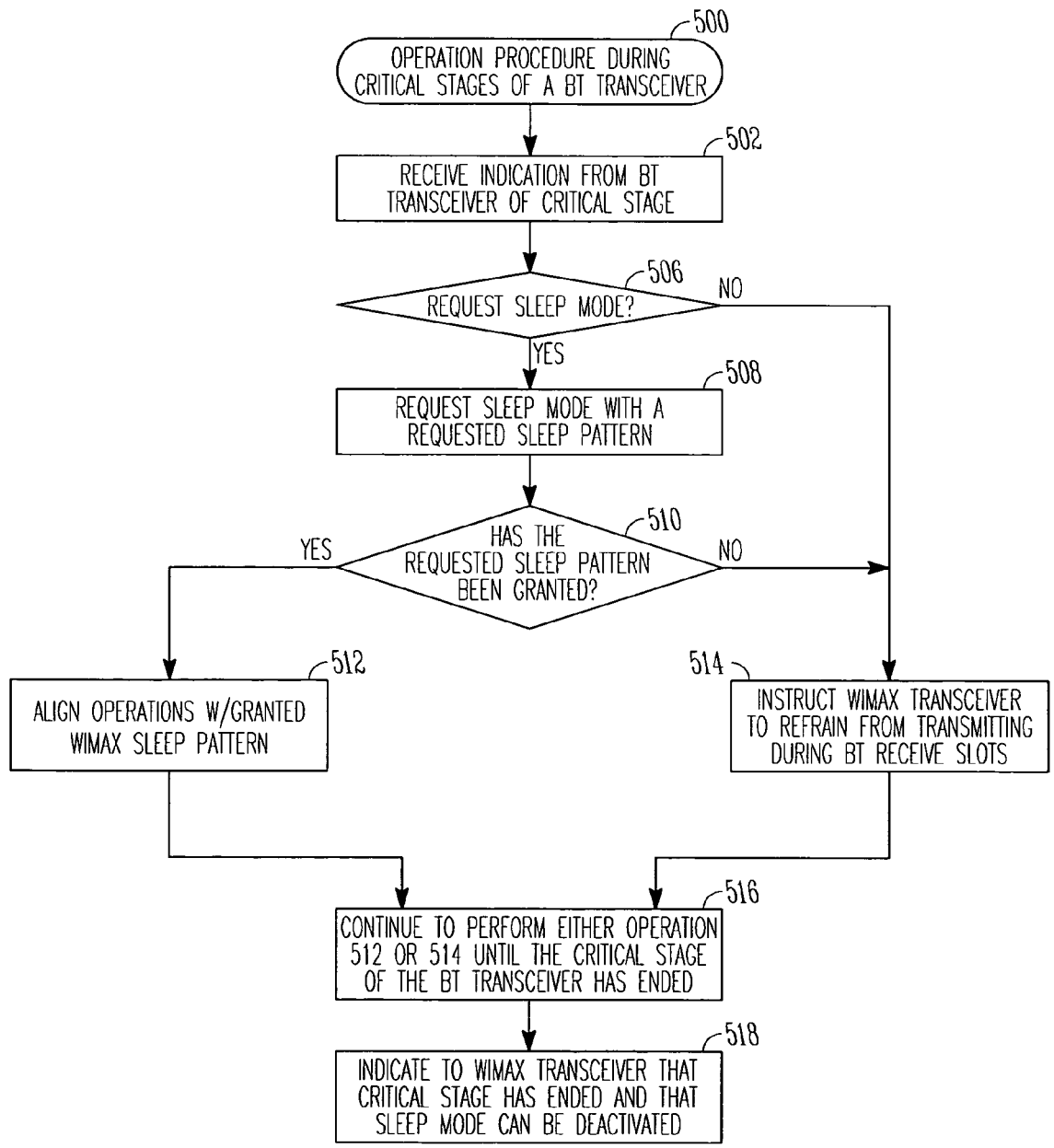
FIG. 5 is a flow chart of a procedure for operating a wireless communication device during critical stages of a BT transceiver in accordance with some embodiments.

FIG. 5 is a flow chart of a procedure for operating a wireless communication device during critical stages of a BT transceiver in accordance with some embodiments. The operations of procedure 500 may be performed by BT transceiver 108 (FIG. 1) and/or WiMax transceiver 106 (FIG. 1).

Referring to FIG. 1 and FIG. 5, in operation 502, BT transceiver 108 may enter a critical stage, such as device discovery or connection establishment, and may provide an indication of this to WiMax transceiver 106. Operation 502, for example, may be initiated when a call is received from WiMax base station 102 and a user wishes to use a BT headset, as BT device 110 to answer the call.

In response to receipt of the indication provided by BT transceiver 108, WiMax transceiver 106 may determine whether or not to send a request to WiMax base station 102 to enter sleep mode. If WiMax transceiver 106 decides to send the request, operation 508 is performed. If WiMax transceiver 106 decides not to send the request, operation 514 is performed.

In operation 508, the request to enter sleep mode is sent to WiMax base station 102. The request may include a requested sleep pattern. Examples of requested sleep patterns are described below.

Operation 510 determines whether or not the requested sleep pattern has been granted. When the requested sleep pattern is granted, operation 512 is performed. When the requested sleep pattern is not granted, operation 514 is performed. Operation 514 may also be performed when a non-requested sleep pattern is granted, or when the request to enter sleep mode is denied by WiMax base station 102.

In operation 512, BT transceiver 108 may align its operations with the granted WiMax sleep pattern requested in operation 508. Since the requested sleep pattern is granted, BT active operations will be located within WiMax sleep frames, having no impact on WiMax activities. For paging operations, BT transceiver 108 transmits a non-continuous sequence of page trains based on the granted sleep pattern, such as sequence 213 (FIG. 2) to establish a connection with a BT device. For inquiry operations, BT transceiver 108 transmits a non-continuous sequence of inquiry trains based on the granted sleep pattern to discover a BT device.

In operation 514, either WiMax transceiver 106 is not in sleep mode or a non-requested sleep pattern has been granted. When WiMax transceiver 106 is not in sleep mode, BT transceiver 108 transmits the non-continuous sequence of trains based on the requested sleep pattern and, as discussed above, may instruct WiMax transmitter 106 to refrain from transmitting at least during BT receive slots 307 (FIG. 3). When a non-requested sleep pattern is granted, BT transceiver 108 may transmit a non-continuous sequence of trains based on the granted non-requested sleep pattern, as determined by frame-sync signal 116, if M1 and M2 can be selected so that page scan window 222 will coincide with one complete train 203 within two page scan intervals 220. When M1 and M2 of a non-continuous sequence cannot be selected for the granted non-requested sleep pattern so that page scan window 222 will coincide with one complete train 203 within two page scan intervals 220, BT transceiver 108 may transmit the non-continuous sequence of trains 203 based on the requested sleep pattern and may signal WiMax transceiver 106 using BT active signal 112 to stop or to refrain from transmitting during receive slots 307 of trains 203. Thus trains 203 may end up being transmitted during WiMax active frames.

In operation 516, the transmission of the non-continuous sequence of trains in accordance with either operation 512 or 514 may be performed until the critical stage of BT transceiver 108 has ended. When the critical stage of BT transceiver 108 has ended, either BT device 110 has been discovered, or a connection has been established with BT device 110.

In operation 518, BT transceiver 108 may indicate to WiMax transceiver 106 that the critical stage has ended. WiMax transceiver 106 may elect to return to an active communication mode from the sleep mode when a sleep mode was entered into. The active communication mode may allow active communications with BT device 110. Note that during sleep mode, WiMax transceiver 106 actively communicates with WiMax base station 102 allowing an incoming call to be received and processed during sleep mode.

Although the individual operations of procedure 500 are illustrated and described as separate operations, one or more of the individual operations may be performed concurrently, and nothing requires that the operations be performed in the order illustrated.

Although wireless communication device 104 (FIG. 1) is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), transceiver-frequency integrated circuits (RFICs) and combinations of various hardware and logic circuitry for performing at least the functions described herein. In some embodiments, the functional elements of wireless communication device 104 (FIG. 1) may refer to one or more processes operating on one or more processing elements.

The following description refers to FIGS. 1 through 4 together. Some embodiments described herein provide solutions that allow a BT connection to be established when WiMax transceiver 106 has active connection with WiMax base station 102. Inquiry/Inquiry scan procedures may be used for BT device discovery. Page/page scan procedures may be used for BT connection establishment. BT transceiver 108 may be used to page/inquiry BT device 110 or to page scan/inquiry scan BT device 110, depending on different usages of BT device 110. In the following example, wireless communication device 104 may be used for either page or page scan. When wireless communication device 104 has an active WiMax connection, BT transceiver 108 may decide to page the BT device 110 under a certain trigger condition (e.g., an incoming call request is received from WiMax base station 102) to establish the connection. BT transceiver 108 may also decide to scan for other BT devices periodically, while having an active WiMax connection.

Since Inquiry/Inquiry Scan procedures are very similar to Page/Page Scan procedures, example embodiments described herein refer to page/page scan procedures. These embodiments may be equally applied to inquiry/inquiry scan. A brief description of the page scan and paging procedures is discussed below. In these example embodiments, the term "page scan device" refers to BT device 110, and the term "paging device" refers to BT transceiver 108, although in other embodiments, BT device 110 may operate as a paging device and BT transceiver 108 may operate as the page scan device.

Page Scan Procedure

A page scan device may be configured to use either the standard or interlaced scanning procedure. During a standard scan, a device listens for the duration of scan window 222 (FIG. 2) is $T_{w\_page\_scan}$, while the interlaced scan is performed as two back-to-back scans of $T_{w\_page\_scan}$. An interlaced scan may speed up the paging procedure. During each scan window, the device may listen at a single hop frequency and the scan window may be long enough such that the paging device may transmit to 16 page frequencies. A different scanning frequency is selected every 1.28 sec and the total number of page scan frequency hops is 32. The scan interval 220 $T_{page\_scan}$ is defined as the interval between the beginnings of two consecutive page scans. The default value for $T_{page\_scan}$ is 1.28 sec; the default value for $T_{w\_page\_scan}$ is 11.25 ms (i.e., 18 slots). Inquiry scan procedure is similar to page scan with an inquiry scan window $T_{w\_inquiry\_scan}$ out of every inquiry scan interval $T_{inquiry\_scan}$.

Paging Procedure Timing

During the paging procedure, the paging device transmits page messages corresponding to the page scan device with a hop rate of 3200 hops/sec. In a single TX slot (i.e., 625 μs), the paging device may transmit on two different hop frequencies. The first transmission starts at the beginning of the TX slot 305 (FIG. 3) and the second transmission starts at 312.5 μs after the first transmission. In a single RX slot 307 (FIG. 3), the paging device may listen for the slave page response message on two different hop frequencies. Similar to transmission, the first reception nominally starts at the beginning of the RX slot 307 (FIG. 3) and the second reception nominally starts at 312.5 μs after the first nominal reception. The paging device tries to coincide with the scan activities of paged device by transmitting a train of identical page messages 309 (FIG. 3) at different hop frequencies and listens in between the transmit intervals until it receives a response from the paged device.

The paging device covers 16 different hop frequencies in one train of 16 slots (or 10 ms). There are two trains: trains A and B of 16 frequencies each. Since the paging device does not know when the paged device will start the scan window, the paging device has to repeat train for $N_{page}$ times or until a response is received, whichever is shorter. $N_{page}$ may be calculated as $T_{page\_scan}/10$ ms. For example, if the scan interval of the paged scan device is 1.28 s, $N_{page}$ may be at least 128. The paging device first transmits train A for $N_{page}$ times, if no response is obtained, then train B may be repeated for $N_{page}$ times. If no response is obtained, train A may be tried again $N_{page}$ times. Alternate use of train A and train B may be continued until a response is received or the page timeout is exceeded. The page timeout by default is set to 5.12 second. Inquiry procedure is similar to the paging procedure.

BT Page/Inquiry Procedure with an Active WiMax Connection

In some example embodiments, a typical WiMax frame duration may be 5 ms. In accordance with the non-continuous paging procedure, the paging device actively pages for a duration of M1*5 ms, pauses for M2*5 ms before paging again. This is illustrated in FIG. 2. IN some embodiments, by restricting M1 to be multiples of two, the train A or train B may completely fit into the active page duration (each train lasts for 10 ms to cover 16 page scan frequency hops). Train A may be repeated for at least two page scan interval duration (i.e., $2\ T_{page\_scan}$) before switching to train B. Train B may again be repeated for at least two page scan interval duration before train A is tried again if no response is received.

Since the scheduled TX/RX at different frequency hops within each train is not changed, the frequency domain property of the existing paging procedure defined by the Bluetooth specification is satisfied. That is, one of the frequencies in train A or B used by the paging device will be the hop frequency the page scan device will listen to.

In accordance with embodiments, trains transmitted in accordance with non-continuous sequence 202 should be configured to that scan window 222 (FIG. 2) of the page scan device coincides with a complete train 203 within $2 * T_{page\_scan}$ duration. To explain this, let X be the number of 5 ms-slots within one $T_{page\_scan}$ duration, hence $X = T_{page\_scan}/5$ ms. Let $\Lambda$ be a set of integers ($\Lambda = [0 \ldots M1-1]$), and $\Gamma$ be a set of integers ($\Gamma = [M1 \ldots M1+M2-1]$). It may be shown that, under the condition defined by Eq. (1), the scan window of the page scan device will coincide with a complete train in time within $2 * T_{page\_scan}$ duration.

$$\Gamma \subseteq \left(\left(\left\lceil \frac{X}{M1+M2} \right\rceil * (M1+M2) + \Lambda \right) \bmod X\right) \bmod (M1+M2) \quad (1)$$

Two examples are M1=4, M2=2, and M1=2, M2=1. To demonstrate, in one example in FIG. 2, where it is assumed that $T_{page\_scan}=1.28$ s, $T_{w\_page}=11.25$ ms, M1=4 and M2=2. It may be verified that the condition given in Eq. (1) is satisfied with M1=4 and M2=2. In FIG. 2, the page scan interval $T_{page\_scan}$ is represented with time segments in the unit of 5 ms, and N is the index of each time segment (N $\in[1,256]$ in this example). It is observed within the first $T_{page\_scan}$ interval of the paging device, the first two trains (i.e., 20 ms) cover the first four time segments (i.e., N=1, 2, 3, 4). After that, the train is paused for next two segments (i.e., when N=5, 6). If the page scan device happens to start its scan window during this period of time, the page messages will not be received by the page scan device in the first $T_{page\_scan}$ interval. As the non-continuous paging procedure progresses into the second $T_{page\_scan}$ interval, the trains shifts and the first two trains in the second $T_{page\_scan}$ interval will cover the $3^{rd}$, $4^{th}$, $5^{th}$, $6^{th}$ time segments (i.e., N=3, 4, 5, 6). In fact, all time segments that are not covered by the paging device during the first $T_{page\_scan}$ interval will be covered during the second $T_{page\_scan}$ interval. The total number of trains to be transmitted may be at least 171 (i.e., $N_{page} >= 171$).

Non-continuous inquiry procedure may also be used to enable initial device discovery while having an active WiMax connection. In these embodiments, X in Eq. (1) may be redefined as $X = T_{inquiry\_scan}/5$ ms.

To help ensure the non-continuous page/inquiry procedure of BT transceiver 108 is not affected by WiMax activities, BT transceiver 108 may proceed with its scheduled transmissions for page/inquiry messages regardless of the state of WiMax transceiver 106. Additionally, during scheduled BT RX slots 307, WiMax transceiver 106 is configured to refrain from transmitting. In accordance with some embodiments, these constraints may be enforced on WiMax transceiver 106 in several ways.

In one way, WiMax transceiver 106 may request to enter sleep mode and is granted by BS with the sleep pattern consistent with the non-continuous page/inquiry procedure of BT transceiver 108. That is, WiMax transceiver 106 will sleep for M1 frame when BT transceiver 108 is actively page/inquiry and be active for M2 frames when BT transceiver 108 pauses its page/inquiry procedure. In FIG. 2 WiMax sleep pattern 213 is illustrated according to the non-continuous paging procedure of BT transceiver 108.

In another way, WiMax transceiver 106 does not schedule a sleep mode. Instead, WiMax transceiver 106 is configured to avoid transmitting whenever BT transceiver 108 is in scheduled RX slots. Note that using this method, WiMax transceiver 106 may suffer from both DL and UL losses during BT page/inquiry procedure, thus potentially degrade WiMax cell capacity.

In another way, when WiMax transceiver 106 requests sleep mode but the sleep pattern granted by BS is different from the pattern requested, WiMax transceiver 106 may refrain transmitting even during active frames if BT transceiver 108 happens to be in scheduled RX slots 307.

Enabling BT Page Scan/Inquiry Scan with Active WiMax Connection

A page scan device will scan a page scan hopping frequency for $T_{w\_page\_scan}$ every $T_{page\_scan}$ interval. In some embodiments, to prevent WiMax transmissions interfering with BT transceiver 108 receptions during scan window 222 (FIG. 2), WiMax transceiver 106 requests the sleep pattern based on the page scan procedure and the requested pattern is granted by the base station. That is, WiMax transceiver 106 will be in sleep mode for $$\left\lceil \frac{T_{w\_page\_scan}}{5 \text{ ms}} \right\rceil$$

frames out of every $T_{page\_scan}$ interval. For example, basing on the default values defined by BT SPEC with $T_{page\_scan}=1.28$ s and $T_{w\_page\_scan}=11.25$ ms, WiMax transceiver 106 may enter sleep mode for 3 frames out of every 256 frames.

In some other embodiments, to prevent WiMax transmissions interfering with BT transceiver 108 receptions during scan window 222 (FIG. 2), WiMax transceiver 106 does not schedule a sleep mode. Instead, it avoids transmitting whenever BT transceiver 108 starts its scan window. Using this method, WiMax transceiver 106 may suffer from UL losses during page scan procedure, and may potentially degrade the WiMax cell capacity.

In some other embodiments, to prevent WiMax transmissions interfering with BT transceiver 108 receptions during scan window 222 (FIG. 2), when WiMax transceiver 106 requests sleep mode but the sleep pattern granted by BS is different from the pattern requested, the combination of method 1 and method 2 mentioned above may be used. That is, WiMax transceiver 106 may avoid transmitting even during active frames if BT transceiver 108 happens to be in scan window.

In accordance with some embodiments, two types of information may be conveyed by BT active signal 112. The critical stage BT transceiver 108 is in as well as when the critical stage starts/ends. Table 1 gives a list of critical stages BT transceiver 108 may be in. If BT transceiver 108 uses parameters other than default values that may be defined in the Bluetooth specification, the values of key parameter associated with the critical stage may also be conveyed. The examples of key parameters include: M1 and M2 in the case of page and inquiry; $T_{w\_page\_scan}$ and $T_{page\_scan}$ in the case of page scan; $T_{w\_inquiry\_scan}$ and $T_{inquiry\_scan}$ in the case of inquiry scan. WiMax transceiver 106 may assume the default values if no additional parameter is supplied. Given the knowledge that BT has just started a critical stage, WiMax transceiver 106 may request the corresponding sleep mode accordingly, as listed in Table 1. For example, for paging procedure, WiMax transceiver 106 may request 4 sleep frames out of every 6 frames if using the default BT settings. When the paging procedure is completed and the initial connection has been established, the critical stage of BT transceiver 108 ends. Knowing that the critical stage of BT transceiver 108 has ended, WiMax transceiver 106 may thus deactivate its sleep mode and return to full duty cycle if desired so.

TABLE 1

Critical stage of BT transceiver 108

| Critical stage | Description | WiMax Sleep pattern |
| --- | --- | --- |
| Page | Initial connection establishment | M1 frames sleep / M2 frames listen |
| Inquiry | Initial device discovery | M1 frames sleep / M2 frames listen |
| Page Scan | Initial connection establishment | $\left\lceil \frac{T_{w\_page\_scan}}{5\,ms} \right\rceil$ frames sleep out of every $T_{page\_scan}$ duration |
| Inquiry Scan | Initial device discovery | $\left\lceil \frac{T_{w\_inquiry\_scan}}{5\,ms} \right\rceil$ frames sleep out of every $T_{inquiry\_scan}$ duration |

In some embodiments, BT active signal 112 may also indicate that BT transceiver 108 is in the scheduled RX slots of a critical stage, such as the scheduled response receiving slots for page/inquiry procedure or the scheduled scan window for page scan/inquiry scan procedure. The knowledge that BT is in critical RX slots may help prevent WiMax transceiver 106 from transmitting during that period of time if WiMax transceiver 106 is not in sleep.

In some embodiments, BT active signal 112 may be a combination of hardware lines and software based signaling. This disclosure intends to define the function requirements of BT active signal 112 but leaving the implementation details of BT active signal 112 out of the scope.

In some embodiments, frame-sync signal 116 may convey WiMax frame timing information. Based on the timing conveyed by frame-sync signal 116, BT may align its slot boundary with the start of a WiMax frame. In some other embodiments, frame-sync signal 116 may also convey sleep pattern 213 of WiMax transceiver 106 granted by WiMax base station 102, including when the sleep starts, how long each sleep lasts, and the sleep period. With such knowledge, BT transceiver 108 may schedule its operations according to the sleep pattern if it is possible. For example, BT transceiver 108 may try to fit its page/inquiry trains into the sleep intervals as much as possible in the case of page/inquiry; or try to fit its scan window into the sleep intervals as much as possible in the case of page scan/inquiry scan.

In some embodiments, frame-sync signal 116 may be a combination of hardware line and software based signaling. As shown in FIG. 4, frame-sync signal 116 has a rising edge at the beginning of the first sleeping frame, and remains high until the beginning of the first listen frame. At the beginning of each subsequent listen frame, frame-sync signal 116 has a rising edge and falls down quickly after a short duration. In this way, by monitoring the rising edge of frame-sync signal 116, BT transceiver 108 may tell the WiMax frame timing; by detecting the long durations with high level signal (i.e., no less than 5 ms), BT transceiver 108 may determine the sleep pattern of WiMax transceiver 106.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device comprising:
    a broadband wireless access network (BWAN) transceiver to communicate with a base station using an orthogonal frequency division multiple access (OFDMA) technique; and
    a short-range frequency-hopping (SRFH) transceiver to transmit a non-continuous sequence of trains for receipt by a SRFH device when the BWAN transceiver has an active connection with the base station,
    wherein the non-continuous sequence of trains includes a regularly repeating vacant transmission interval selected to coincide with listen intervals of OFDMA frames during sleep mode, and
    wherein the non-continuous sequence of trains is transmitted to either discover or establish an initial connection with the SRFH device.

2. The wireless communication device of claim 1 wherein the vacant transmission interval comprises a multiple number (M2) of OFDMA frame durations selected to regularly repeat within the non-continuous sequence of trains during a page scan interval, and
    wherein the non-continuous sequence of trains further includes a regularly repeating active transmission interval comprising one or more trains, the active transmission interval comprising a multiple (M1) of OFDMA frame durations selected to regularly repeat within the non-continuous sequence of trains during the page scan interval.

3. The wireless communication device of claim 2 wherein M1 and M2 are selected so that a scan window of the SRFH device coincides with one complete train within twice the duration of the page scan interval, and
    wherein the trains comprise either page trains used by the SRFH transceiver to establish a connection with a known SRFH device, or inquiry trains used by the SRFH transceiver to discover a SRFH device.

4. The wireless communication device of claim 1 wherein the SRFH transceiver is configured to transmit a continuous sequence of trains when a connection between the BWAN transceiver and the base station is not established, the continuous sequence of trains being devoid of the regularly repeating vacant transmission intervals.

5. The wireless communication device of claim 2 wherein M1 and M2 are determined based on a requested sleep pattern of the OFDMA frames,
    wherein the sleep pattern comprises alternating sleep intervals and listen intervals each comprising a number of OFDMA frames,
    wherein the regularly repeating vacant transmission intervals are selected to coincide with the listen intervals, and
    wherein the regularly repeating active transmission intervals are selected to coincide with the sleep intervals.

6. The wireless communication device of claim 5 wherein the BWAN transceiver provides a frame-sync signal to the SRFH transceiver, the frame-sync signal indicating timing of the OFDMA frames and the sleep pattern of the BWAN transceiver,
    wherein the SRFH transceiver is configured to align a slot boundary with the frame-sync signal and to detect the sleep pattern of the BWAN transceiver,
    wherein the listen intervals of the sleep pattern are indicated by shorter duration signal-level changes of the frame-sync signal, and
    wherein the sleep intervals of the sleep pattern are indicated by longer duration signal levels of the frame-sync signal.

7. The wireless communication device of claim 1 wherein the SRFH transceiver is configured to indicate to the BWAN transceiver that the SRFH transceiver is entering a critical stage to either discover a SRFH device or establish a connection with an already discovered SRFH device,
    wherein, in response to the indication by the SRFH transceiver, the BWAN transceiver is configured to send a request to the base station to enter sleep mode with a requested sleep pattern, and
    wherein when the base station grants the requested sleep pattern, the SRFH transceiver configures the non-continuous sequence of trains to include the regularly repeating vacant transmission intervals selected to coincide with listen intervals.

8. The wireless communication device of claim 7 wherein when the base station does not grant the requested sleep pattern, and when the BWAN transceiver either does not enter sleep mode or is granted a non-requested sleep pattern, the SRFH transceiver is configured to transmit the non-continuous sequence of trains during a critical stage and to signal the BWAN transceiver to refrain from transmitting during receive slots 307 of the trains.

9. The wireless communication device of claim 1 wherein the trains comprise page trains when an initial connection is being established with the SRFH device, and
    wherein the trains comprise inquire trains when the SRFH device is being discovered.

10. The wireless communication device of claim 9 wherein during a page scan or an inquire scan, the SRFH device is configured to either align a scan window with sleep intervals of the BWAN transceiver or to signal the BWAN transceiver to refrain from transmitting during the scan window.

11. The wireless communication device of claim 1 wherein the BWAN transceiver comprises a Worldwide Interoperability for Microwave Access (WiMax) transceiver, the base station comprises a WiMax base station, the SRFH transceiver comprises a Bluetooth (BT) transceiver, and the SRFH device comprises a BT device.

12. A method of operating a multi-transceiver wireless communication device comprising:
    transmitting, by a short-range frequency-hopping (SRFH) transceiver, a non-continuous sequence of trains to either discover or establish an initial connection with a SRFH device,
    wherein the non-continuous sequence of trains includes a regularly repeating vacant transmission interval selected to coincide with listen intervals of a sleep pattern of a co-located broadband wireless access network (BWAN) transceiver.

13. The method of claim 12 wherein the BWAN transceiver communicates with a base station using an orthogonal frequency division multiple access (OFDMA) technique,
    wherein the SRFH transceiver to transmits the non-continuous sequence of trains for receipt by the SRFH device when a connection is currently established between the BWAN transceiver and the base station, and
    wherein the regularly repeating vacant transmission interval is selected to coincide with listen intervals of OFDMA frames during sleep mode.

14. The method of claim 12 wherein the vacant transmission interval comprises a multiple number (M2) of OFDMA frame durations selected to regularly repeat within the non-continuous sequence of trains during a page scan interval, and
    wherein the non-continuous sequence of trains further includes a regularly repeating active transmission interval comprising one or more trains, the active transmission interval comprising a multiple (M1) of OFDMA frame durations selected to regularly repeat within the non-continuous sequence of trains during the page scan interval.

15. The method of claim 14 further comprising selecting M1 and M2 so that a scan window of the SRFH device coincides with one complete train within twice the duration of the page scan interval, and
wherein the trains comprise either page trains used by the SRFH transceiver to establish a connection with a known SRFH device, or inquiry trains used by the SRFH transceiver to discover a SRFH device.

16. The method of claim 12 further comprising transmitting a continuous sequence of trains when a connection between the BWAN transceiver and a base station is not established, the continuous sequence of trains being devoid of the regularly repeating vacant transmission intervals.

17. The method of claim 12 further comprising:
indicating to the BWAN transceiver that the SRFH transceiver is entering a critical stage to either discover a SRFH device or establish a connection with an already discovered SRFH device;
sending a request to a base station to enter sleep mode with a requested sleep pattern in response to the indication by the SRFH transceiver; and
configuring the non-continuous sequence of trains to include the regularly repeating vacant transmission intervals selected to coincide with listen intervals when the base station grants the requested sleep pattern.

18. The method of claim 12 wherein the trains comprise page trains when an initial connection is being established with the SRFH device, and
wherein the trains comprise inquire trains when the SRFH device is being discovered.

19. The method of claim 18 wherein during a page scan or an inquire scan, the method further comprises either:
aligning a scan window with sleep intervals of the BWAN transceiver; or
signaling the BWAN transceiver to refrain from transmitting during the scan window.

20. A non-transitory computer-readable medium that stores instructions for execution by one or more processors for configuring a multi-transceiver wireless communication device perform the following operations:
transmitting a non-continuous sequence of trains to either discover or establish an initial connection with a SRFH device, the non-continuous sequence of trains including a regularly repeating vacant transmission interval selected to coincide with listen intervals of a sleep pattern of a co-located broadband wireless access network (BWAN) transceiver; and
transmitting a continuous sequence of trains when a connection between the BWAN transceiver and a base station is not established, the continuous sequence of trains being devoid of the regularly repeating vacant transmission intervals.

21. The non-transitory computer-readable medium of claim 20 wherein the vacant transmission interval comprises a multiple number (M2) of OFDMA frame durations selected to regularly repeat within the non-continuous sequence of trains during a page scan interval, and
wherein the non-continuous sequence of trains further includes a regularly repeating active transmission interval comprising one or more trains, the active transmission interval comprising a multiple (M1) of OFDMA frame durations selected to regularly repeat within the non-continuous sequence of trains during the page scan interval.

22. The non-transitory computer-readable medium of claim 20 wherein the BWAN transceiver communicates with a base station using an orthogonal frequency division multiple access (OFDMA) technique,
wherein the instructions cause a SRFH transceiver to transmits the non-continuous sequence of trains for receipt by the SRFH device when a connection is currently established between the BWAN transceiver and the base station, and
wherein the instructions cause the selection of the regularly repeating vacant transmission interval to coincide with listen intervals of OFDMA frames during sleep mode.

23. The non-transitory computer-readable medium of claim 20 wherein the trains comprise page trains when an initial connection is being established with the SRFH device,
wherein the trains comprise inquire trains when the SRFH device is being discovered, wherein during a page scan or an inquire scan, the instructions cause either an alignment of a scan window with sleep intervals of the BWAN transceiver or signaling of the BWAN transceiver to refrain from transmitting during the scan window.

* * * * *

UNITED STATES PATENT AND TRADEMARK OFFICE
CERTIFICATE OF CORRECTION

| | | |
|---|---|---|
| PATENT NO. | : 8,149,804 B2 | Page 1 of 1 |
| APPLICATION NO. | : 12/062707 | |
| DATED | : April 3, 2012 | |
| INVENTOR(S) | : Xue Yang et al. | |

It is certified that error appears in the above-identified patent and that said Letters Patent is hereby corrected as shown below:

On the face page, in field (75), in "Inventors", in column 1, line 1, delete "Portand, OR (US);" and insert -- Portland, OR (US); --, therefor.

Signed and Sealed this
Third Day of July, 2012

David J. Kappos
*Director of the United States Patent and Trademark Office*